US011127058B2

(12) United States Patent
Barton et al.

(10) Patent No.: US 11,127,058 B2
(45) Date of Patent: *Sep. 21, 2021

(54) COMPUTER PROGRAM, METHOD, AND SYSTEM FOR FACILITATING COMMERCIAL TRANSACTIONS BETWEEN A USER AND A VENDOR

(71) Applicant: Freightview, Inc., Overland Park, KS (US)

(72) Inventors: Tim A. Barton, Leawood, KS (US); Jason Alexander Roberts, Belton, MO (US)

(73) Assignee: Freightview, Inc., Overland Park, KS (US)

( * ) Notice: Subject to any disclaimer, the term of this patent is extended or adjusted under 35 U.S.C. 154(b) by 168 days.

This patent is subject to a terminal disclaimer.

(21) Appl. No.: 16/555,646

(22) Filed: Aug. 29, 2019

(65) Prior Publication Data
US 2019/0385205 A1 Dec. 19, 2019

Related U.S. Application Data

(63) Continuation of application No. 14/257,617, filed on Apr. 21, 2014, now Pat. No. 10,402,878.

(51) Int. Cl.
*G06Q 30/00* (2012.01)
*G06Q 30/06* (2012.01)
(Continued)

(52) U.S. Cl.
CPC ... *G06Q 30/0611* (2013.01); *G06Q 10/08345* (2013.01); *G06Q 20/12* (2013.01); *G06Q 20/40* (2013.01)

(58) Field of Classification Search
None
See application file for complete search history.

(56) References Cited

U.S. PATENT DOCUMENTS

| 6,381,597 B1* | 4/2002 | Lin | G06Q 30/06 707/707 |
| 2005/0177785 A1* | 8/2005 | Shrader | G06Q 30/06 715/230 |
| 2014/0310778 A1* | 10/2014 | Zhang | H04L 63/102 726/4 |

OTHER PUBLICATIONS

Jeffrey O. Kephart et al. "Shopbot Economics" Autonomous Agents and Multi-Agent Systems, 5, 255-287, © 2002 Kluwer Academic Publishers. (Year: 2002).*

(Continued)

*Primary Examiner* — Naeem U Haq
(74) *Attorney, Agent, or Firm* — Erise IP, P.A.

(57) ABSTRACT

Embodiments facilitate commercial transactions between a user and one or more vendors without requiring a user to provide information unique to a user account for the vendor. Embodiments prompt a user to select one or more vendors from a list of vendors. An authorization is obtained from the user to allow the computer program to retrieve the product from the list of vendors and on behalf of the user. The computer program then requests and receives, from each vendor, information for accessing an electronic resource of the vendor. In embodiments, the received information is unique to the user account for the vendor. The computer program then obtains the product from the vendor based on the received information. The computer program thus presents a centralized management service for obtaining product from a plurality of vendors and without requiring the user to provide user information unique to the user for each vendor.

20 Claims, 16 Drawing Sheets

(51) Int. Cl.
    *G06Q 20/40*     (2012.01)
    *G06Q 10/08*     (2012.01)
    *G06Q 20/12*     (2012.01)

(56) References Cited

OTHER PUBLICATIONS

Hyun-Woo Kim et al. "Time Pattern Locking Scheme for Secure Multimedia Contents in Human-Centric Device" Hindawi Publishing Corporation, The Scientific World Journal vol. 2014, Article ID 796515, 9 pages (Year: 2014).*

* cited by examiner

Please activate these customers

[ Show Pending ] [ Show Active ]

Search: [_____]

| Authorized by ▼ | Company | Requested | |
|---|---|---|---|
| Saia Shipper Test | Saia | a few seconds ago | Work |
| Mark Gering | Designer Corporation | a few seconds ago | Work |
| Lucas Griffiths | Overland Manufacturing | a month ago | Work |
| Joe Demo | Demo Company | 18 days ago | Work |
| Joe Demo | Demo | 18 days ago | Work |
| Jim Example | Example Company | a few seconds ago | Work |

FIG. 9

Authorization Request for Saia Motor Freight

*Jim Example, the Shipping Manager for Example Company has requested access to their rates via Freightview TMS.*

Locations (1) 420 Adams Street Southwest, Ronan, MT 59864, USA
Account ID:

(2) 901 Carondelet Drive, Kansas City, MO 64114, USA
Account ID:

Electronic signature on file

Jim Example
Shipping Manager, Example Company

*Please note that the Federal E-Sign law ensures the validity and legal effect of contracts entered into electronically and states that a contract or signature may not be denied legal effect, validity or enforceeability solely because it is in electronic form.*

FIG. 11

Activate a customer

Jim Example, Shipping Manager for Example Company has requested access to their rates via Freightview TMS.

Please enter the Account ID for each of their addresses:

420 Adams Street Southwest, Ronan, MT 59864, USA    987654321

901 Carondelet Drive, Kansas City, MO 64114, USA    876543210

Click Done when this customer is setup and ready to go.

View printable authorization

Done    Cancel

FIG. 12

Activate a customer ✕

Vern Example, Shipping Manager for Example Corp. has requested access to their rates via Freightview TMS.

[ View printable authorization ]

API Credentials
Your API requires username/password credentials. Please provide them for this shipper below Username
[ Username ]

Password
[ Password ]

Confirm Password
[ Confirm Password ]

Please enter the Account ID for each of their addresses:

15701 Hinkle Avenue, Belton, MO 64012, USA    [ Account ID ]

901 Carondelet Drive, Kansas City, MO 64114, USA    [ Account ID ]

Click Done when this customer is setup and ready to go.

[ Done ] [ Cancel ]

FIG. 13

COMPUTER PROGRAM, METHOD, AND SYSTEM FOR FACILITATING COMMERCIAL TRANSACTIONS BETWEEN A USER AND A VENDOR

RELATED APPLICATIONS

This application is a continuation patent application and claims priority benefit, with regard to all common subject matter, of earlier-filed U.S. patent application Ser. No. 14/257,617 filed Apr. 21, 2014, entitled "COMPUTER PROGRAM, METHOD, AND SYSTEM FOR FACILITATING COMMERCIAL TRANSACTIONS BETWEEN A SUER AND A VENDOR" ("the '617 Application"). The above-referenced patent application is hereby incorporated by reference into the present application in its entirety.

BACKGROUND

1. Field

Embodiments of the invention relate to facilitating online transactions with vendors. In particular, embodiments of the invention provide a computer program, a method, and a system for facilitating a transaction between a user and a vendor via an electronic resource, such as a website or application, without prompting the user for identification information related to a user's account with the vendor.

2. Related Art

Although many individuals have turned to using online (e.g., the Internet) portals, such as websites or Internet-connected applications ("apps") to conduct transactions with a vendor, there are still those that prefer to conduct transactions through disparate communication methods, such as mail (electronic or postal), in person, and telephone. When an individual does use an online portal, the individual is tasked with registering and keeping track of an authentication credential and Internet identity for each vendor. Should the user conduct electronic transactions with a plurality of vendors, the user is required to maintain a list of the authentication credentials or Internet identities associated with each of the vendors. This is time consuming and often restricts the user's ability to conduct transactions, or at least obtain information regarding a potential transaction, with each of the vendors.

SUMMARY

Embodiments of the invention solve the above-mentioned problems and provide a distinct advantage in connecting a user desiring to purchase a product with a plurality of vendors offering the product. The invention provides a centralized resource for the user to obtain the product or information about the product from the plurality of vendors. In embodiments, the invention is advantageously applicable to vendors that provide product based on a user parameter, i.e., a characteristic, of the user. As a non-limiting example, in some instances a vendor will provide a product to a first user at a first cost and to a second user at a second, different cost. The vendor may choose to provide the same product to both users at the different costs based on a user parameter. Exemplary user parameters may include that the first user purchases a high volume from the vendor, whereas the second user does not. Embodiments of the invention also provide the product or product information to the user without the user providing identification information unique to the user and to the vendor. Thus, the user need not input authentication credentials, for example, that otherwise are required for the user to access the vendor.

An embodiment of the invention is briefly summarized below. Various embodiments are described herein, however, and the below summary of one embodiment is not intended to be limiting.

An embodiment of the invention broadly performs the steps of presenting, by an administrator and to a user, a set of vendors, wherein each vendor of said set of vendors provides a good or service, and wherein the user desires to obtain a cost of the good or service provided by each vendor; prompting the user for an authorization to access each vendor of said set of vendors to obtain the cost of the good or service provided by each vendor; receiving, by the administrator and from the user, authorization to access each vendor of said set of vendors on behalf of the user, wherein the user has a preexisting user account for each vendor of said set of vendors, and the preexisting user account is associated with identification information uniquely identifying the preexisting user account; sending, by the administrator and to each vendor of said set of vendors, the authorization provided by the user; sending, by the administrator and to each vendor of said set of vendors, a request to provide the identification information associated with the preexisting user account; receiving, from at least a portion of said set of vendors, the identification information for the respective preexisting user account; accessing, by the administrator and for each vendor for which identification information was received for the respective preexisting user account, a vendor database associated with the vendor using the identification information for the preexisting user account; obtaining, by the administrator and from the vendor database, the cost of the good or service provided by the vendor, wherein the user's identification information for the preexisting user account uniquely identifies the user during the step of obtaining, by the administrator and from the vendor database, the cost of the good or service provided by the vendor, such that the obtained cost of the good or service is based on an identity of the user; and presenting, by the administrator and to the user, the obtained cost of the good or service provided by each vendor, wherein the user is presented the obtained cost of the good or service without having to provide to the administrator or the vendor the user's identification information associated with the user's preexisting user account.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 9 is a screen capture depicting a third prompt of an embodiment of the invention directed to a vendor that has multiple requests from users;

FIG. 11 is a screen capture depicting the graphical user interface of an embodiment of the invention displaying the authorization of the user;

FIG. 12 is a screen capture depicting the graphical user interface of an embodiment of the invention displaying the third prompt;

FIG. 13 is a screen capture depicting the graphical user interface of an embodiment of the invention displaying the third prompt;

Figure 1:
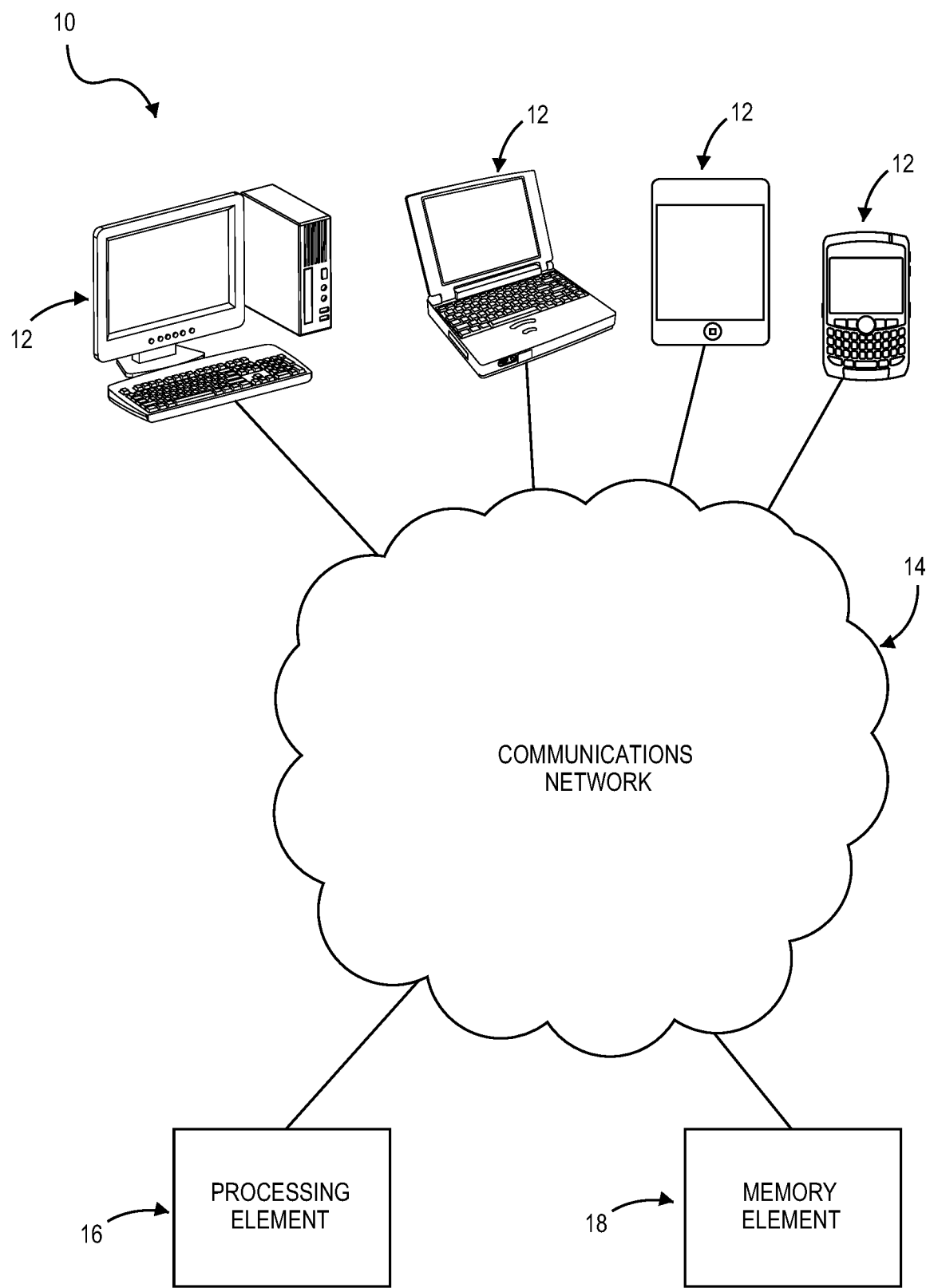
FIG. 1 is a system diagram of an embodiment of the invention depicting various components of the system.

The drawing figures do not limit the current invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Overview of Embodiments of the Invention

Embodiments of the invention provide a computer program, a method, and a system for managing and facilitating transactions, such as commercial transactions, between a user and one or more vendors. In a first embodiment of the invention, a user may obtain a cost of a good or service provided by at least one, and in embodiments, a plurality of vendors at a centralized, electronic resource and without requiring the user to provide identification information for the user and uniquely associated with a preexisting account for the vendors. As a general example, the user has an established, preexisting account with a particular vendor, and the preexisting user account is associated with identification information, such as a username and password, unique to the user account. In other embodiments, the identification information may not necessarily be unique to the user but may otherwise be associated with the preexisting user account.

The user may subsequently desire to obtain the cost of a good or service provided by the vendor. Rather than requiring the user to directly access and communicate with the vendor, such as through an email communication, a phone call, or accessing a website or application of the vendor, the user may access the electronic resource associated with embodiments of the invention. The user may then authorize an administrator of the electronic resource to communicate with the vendor on the user's behalf to obtain the cost of the good or service. Once authorization is received from the user, the administrator communicates directly with the vendor to obtain the user's identification information unique to or otherwise associated with the user's preexisting user account. The vendor then submits the identification information to the administrator, and the administrator in turn uses the identification information to access a vendor database associated with vendor. The administrator may then obtain the cost of the good or service from the vendor and using the user's identification information. The administrator then presents the cost of the good or service to the user.

Advantages of the above-described embodiment of the invention are particularly appreciated when the user desires to obtain the cost of the good or service from the plurality of vendors, as opposed to a single vendor. The electronic resource of embodiments of the invention then allows the user to access a single resource and use the invention as a centralized management service and repository for the plurality of vendors. The user need not individually communicate with each vendor. Moreover, in some embodiments, the cost of the good or service may be unique to the particular user; that is, a first user may receive a first cost for the good or service from the vendor, whereas a second user may receive a second cost for the same good or service from the vendor. Such may occur depending on volume purchased by a particular user, a desire by the vendor to establish a new business relationship with a particular user, a desire by the vendor to operate in a particular geographic area associated with the user, or other factors. Thus, the obtained cost of the good or service is unique to the particular user and is obtained based on the identification information associated with the preexisting user account.

In embodiments of the invention, the user may access and use the services available at the electronic resource without requiring the user to know, remember, or provide the identification information that is unique to each of the preexisting user accounts for each of the plurality of vendors. Thus, if the user desires to obtain the cost of the good or service from the plurality of vendors, such as ten vendors, then the user would normally need to provide identification information for preexisting user accounts for each of the ten vendors. As noted above, the identification information for each preexisting user account is needed by the vendor to obtain the cost of the good or service, wherein the cost is specific to the particular user. To obtain the cost from the plurality of vendors using the electronic resource, the user need only authorize the administrator to obtain the cost on the user's behalf. The administrator of embodiments of the invention will then implement the invention to obtain the cost of the good or service from the plurality of vendors and without requiring the identification information unique to each preexisting user account.

As discussed in more detail below, in other embodiments of the invention, the user may not have a preexisting user account with the vendor. In such an embodiment, the administrator may create or generate a user account specific to the user and for the vendor, and such newly created user account may include identification information uniquely identifying the user. In yet further embodiments, the user may not have a preexisting user account with the vendor, and the administrator uses a universal account specific to the vendor for accessing the cost of the good or service on behalf of the user. In even further embodiments of the invention, the administrator may provide the cost of the good or service for a vendor that has no preexisting relationship with the user or that is not otherwise identified as a vendor from which the user desires to know the cost of the good or service, as discussed in more detail below.

In alternative embodiments of the invention, the user may not desire the cost of the good or service but instead may desire to obtain a product. Products as defined herein are goods or services provided by various vendors to a user. Goods may be tangible or non-tangible. Tangible goods may be, for example, a part, a unit, or a commodity, such as raw or processed materials (e.g., corn or oil). Intangible goods may be media content, such as digital music or video. Services may include, but are not limited, to the following: construction or maintenance of goods, delivery of goods, the performance of research, or an aggregation of information or content. Products may also be a combination of goods and services in an undividable item, such as a meal supplied, prepared, and served by a vendor restaurant.

In some embodiments of the invention, the term "product" may also comprise a cost of a good or service or a quote or estimate for a good or service. Thus, as used herein, "a cost of a good or service" may be encompassed within the term "product," as used herein. Additionally, "product" may include information regarding a particular good or service.

Products may also include any accessory related to the good or service. An accessory as defined herein may be associated goods or services; for example, if the product is a widget for sale, then the accessory may be the delivery by a vendor of said good to a user. Another example of an accessory may be the tracking of the progress of a service to completion and providing of a status related to the progress to a user. Yet another example of an accessory is an extended warranty for a good or service.

As used herein, a "vendor" is a person or entity that offers a good or service, e.g., a product, to a user. Embodiments of the invention are adaptable for use in many industries, and thus, vendors as used herein may include, but are not limited to, any of the following: suppliers that manufacture one or more goods and offer those goods for direct sale to a user; sellers of one or more goods, the sellers having acquired the goods from another party such as a supplier; content providers that distribute goods through an electronic resource; distributors that distribute goods such as shippers or bandwidth providers; and service providers that offer various services.

Exemplary Industries for Use of Embodiments of the Invention

As noted above, embodiments of the invention are adapted for use in a plurality of industries. Thus, reference herein to a particular industry or a particular type of vendor or user is not intended to be limiting. Exemplary industries and how the invention could be used in the industry are provided herein but are also not intended to be limiting.

For purposes of briefly describing the exemplary industries, it should be appreciated that embodiments of the invention may be accessed by the user via an electronic resource, such as a website accessible via the Internet. The electronic resource is operated or controlled by an administrator. The administrator interacts and communicates with the vendor via the computer program of embodiments, and as further discussed below, the computer program performs the steps of the method of embodiments.

Embodiments of the invention are adapted for use in the shipping industry where the user is a shipper and the vendors are carriers. In this embodiment, the user may desire to know a cost for having a plurality of goods shipped by the carrier or may desire to know a cost for the goods. As used throughout, the term "shipper" includes any entity that requires a good to be shipped. For example, a shipper may be a widget manufacturer, and the good that needs to be shipped may be a pallet of widgets. The term "carrier" includes any transportation entity, such as a trucking company, railroad line, airline, a transportation broker, or combinations thereof, which is capable of transporting goods for a shipper via a cargo vehicle. For example, a carrier may be a railroad line, and the goods that need transported are automobiles from a shipper's automobile factory to a dealership in a differing geographic region.

A second exemplar is the fleet service industry where the user operates or administers a fleet of vehicles, such as a metropolitan police department, and the vendors are various vendors that maintain vehicles (e.g., oil changes, suspension alignments, body and paint work, etc.). In this exemplar, the computer program provides cost quotes from a plurality of vendors, which allows the police department to compare the rates of various services offered by the plurality of vendors. Embodiments of the invention also provide status updates from multiple fleet servicers, which allows the police department to monitor the status of multiple repairs across fleet servicers.

Another exemplar is the agricultural industry where the user is a manufacturer of tractors and other agricultural equipment, and the vendors are component suppliers that offer various parts necessary for the assembly of agricultural equipment (e.g., hydraulic cylinders, rubber tires, circuit boards, etc.). In this exemplar, the computer program provides cost quotes from multiple suppliers. The computer program may also provide the user with the ability to search for a specific component across multiple suppliers.

Another exemplar is the insurance industry where the user is a person seeking insurance for various aspects of their personal and professional life. The person may have a spouse and children, be into hobbies associated with risk, such as riding a motorcycle, and own one or more commercial properties, such as a chain of fast food restaurants. The vendors are insurance providers and the products are various insurance policies, such as home, life, automotive, and commercial insurance. The insurance providers provide access to their policies and quotes related to new policies through an electronic resource, such as a website or application.

In this exemplar, the computer program presents to the user various insurance-related services provided by the insurance providers without the user having to provide their identification information, such as a username and password, associated with the electronic resource of each insurance provider. Via the computer program, the user selects the insurance providers that currently provide the user with various insurance policies and/or selects the insurance providers from which the user would like to obtain cost quotes. The computer program then connects to the electronic resources of the selected insurance providers and obtains the username and password from each insurance provider selected by the user. The computer program then provides the status of each existing insurance policy from each insurance provider selected by the user. In addition, the computer program provides quotes related to any insurance policy that may be helpful for the user, such as a new motorcycle insurance policy. In embodiments of the invention, the computer program connects to insurance providers that do not presently have any relationship with the user. In particular, the computer program contacts other insurance provider and requests that these providers create an account for the user. After the insurance provider creates the account for the user, the insurance provider transmits the username and password to the computer program. The computer program then obtains from the insurance providers information associated with the insurance policy and presents the obtained insurance policies to the user. The user is not required to proactively communicate with each insurance provider to obtain policy information, nor is the user required to provide their identification information associated with their respective user account for each insurance provider. The user may access policy information for a plurality of insurance providers at the centralized resource provided by the computer program.

Still another exemplar is the scientific research industry where the user is a research laboratory and the vendors are data acquisition services (e.g., geological monitoring, ecological surveys, chemical analysis, etc.). The user would normally have to log into each data acquisition service to access and download all data files necessary to perform a research study. Embodiments of the invention provide a central repository to retrieve all data files necessary to perform the research study in one location. For example, the computer program may provide the centralized resource, such as the website, accessible by the user. At the website, the user may identify the research laboratories or data acquisition vendors having the information desired by the user and authorize the administrator of the computer program to obtain the desired information on behalf of the user. The computer program of embodiments of the invention will then obtain the identification information associated with the user account for each vendor, use the identification information to obtain from the vendor the desired information, and present the obtained information to the user. As noted above, for this and all exemplary industries, the user may not have a preexisting user account with the vendor. In such a case, the computer program may either create a unique user account for the user or may create or use a preexisting administrator account to obtain the desired information.

One additional exemplar is the digital media content industry where the user is a person that desires access to digital content through a content delivery portal. The content delivery portal may include a dedicated video-game console, an Internet connected digital-video-recorder (DVR), a set-top box providing streaming content (e.g., a ROKU), or a streaming capable Internet-connected television or computing element. The content delivery portal may also include a dedicated application accessible via a service provided by a vendor, such as a NETFLIX application available via a cable-TV subscription. The vendors are digital content owners and distributors that provide access to digital content, such as movies, music, or television programming. The digital content owners provide access to their digital content through the content delivery portal. Conventionally, each digital content owner may provide access to their product through applications or channels accessible at the content delivery portal after a user creates a user account and provides identification information, such as a username, password, and credit card.

In this exemplar, the computer program of embodiments of the invention may either be stored on or accessible by the content delivery portal. The user creates a user account through at the content delivery portal. The portal then connects to the electronic resources of the various vendors and retrieves information related to the various products offered by the vendors, such as previews, pricing quotes, and textual descriptions. When the user browses the digital content through the content delivery portal, the user may identify a particular product for which access is desired, such as a movie. The user indicates, via the content delivery portal, a desire to access the content, at which point the computer program contacts the vendor. The computer program then retrieves the content and provides it to the user through the content delivery portal and debit's the users credit card and pays the vendor. In embodiments, the computer program may provide the vendor either or both of the identification information associated with the preexisting user account or a unique serial number associated with the content delivery portal, such as the unique serial number for a game console.

Overview of System Hardware

The computer program, system, and method of embodiments of the invention may be implemented in hardware, software, firmware, or combinations thereof using a system 10, which broadly comprises computing devices 12 and a communications network 14. The computing devices 12 facilitate the functions and features described herein. The computing devices 12 may comprise any number and combination of processors, controllers, integrated circuits, programmable logic devices, or other data and signal processing devices for carrying out the functions described herein, and may additionally comprise one or more memory storage devices, transmitters, receivers, and/or communication busses for communicating with the various devices of the system 10.

The computing devices 12 may include any device, component, or equipment with a processing element 16 and associated memory elements 18. The processing element 16 may implement operating systems, and may be capable of executing the computer program, which is also generally known as instructions, commands, software code, executables, applications ("apps"), and the like. The processing element 16 may include processors, microprocessors, microcontrollers, field programmable gate arrays, and the like, or combinations thereof. The memory elements 18 may be capable of storing or retaining the computer program and may also store data, typically binary data, including text, databases, graphics, audio, video, combinations thereof, and the like. The memory elements 18 may also be known as a "computer readable storage medium" and may include random access memory (RAM), read only memory (ROM), flash drive memory, floppy disks, hard disk drives, optical storage media such as compact discs (CDs or CDROMs), digital video disc (DVD), and the like, or combinations thereof. In addition to these memory elements 18, the computing devices may further include file stores comprising a plurality of hard disk drives, network attached storage, or a separate storage network.

The computing devices 12 may specifically include mobile communication devices (including wireless devices), work stations, desktop computers, laptop computers, palmtop computers, tablet computers, portable digital assistants (PDA), smart phones, and the like, or combinations thereof. Various embodiments of the computing device 12 may also include voice communication devices, such as cell phones and/or smart phones. In embodiments, the computing devices 12 may have an electronic display operable to display visual graphics, images, text, etc. In certain embodiments, the computer program facilitates interaction and communication through a graphical user interface (GUI) 20 that is displayed via the electronic display. The GUI 20 enables the user to interact with the electronic display by touching or pointing at display areas to provide information to the system 10.

The communications network 14 may be wired or wireless and may include servers, routers, switches, wireless receivers and transmitters, and the like, as well as electrically conductive cables or optical cables. The communications network 14 may also include local, metro, or wide area networks, as well as the Internet, or other cloud networks. Furthermore, the communications network 14 may include cellular or mobile phone networks, as well as landline phone networks, public switched telephone networks, fiber optic networks, or the like.

In embodiments of the invention, the computing devices 12 facilitate connection with one or more electronic resources administered by various vendors. The computing devices 12 use the communications network 14 to connect with the electronic resources. Vendors offer products through the electronic resources. Embodiments of the invention may also be administered via an electronic resource operated, controlled, or directed by an administrator. In embodiments of the invention, an electronic resource may include any of the following: web sites using the Hypertext Transfer Protocol, remotely connected file structures using the File Transfer Protocol, or non-local resources running on local desktop clients or local mobile clients, such as an "app."

The computer program of embodiments of the invention may run on one or more of the computing devices 12. In certain embodiments of the invention, the computer program may be embodied in a stand-alone app downloaded on a user's computing device 12 or in a web-accessible program that is accessible by the user's computing device 12 via the communications network 14. As used herein, the stand-alone app or web-accessible program provides users with access to the electronic resource from which the users can interact with various embodiments of the invention. The computer program comprises a plurality of code segments executable by a computing device 12 for performing the steps of various methods of the invention. The steps of the various methods may be performed in the order shown in FIGS. 15 and 16, or they may be performed in a different order, unless otherwise expressly stated. Furthermore, some steps may be performed concurrently as opposed to sequentially. Also, some steps may be optional. The computer program may also execute additional steps not described herein.

The computer program of embodiments of the invention may be responsive to user input. As defined herein, user input may be received from a variety of computing devices 12 including but not limited to the following: desktops, laptops, calculators, telephones, smartphones, or tablets. The computing devices 12 may receive user input from a variety of sources including but not limited to the following: keyboards, keypads, mice, trackpads, trackballs, pen-input devices, printers, scanners, facsimile, touchscreens, network transmissions, verbal/vocal commands, gestures, button presses or the like.

In embodiments of the invention users and vendors may be provided with different types of accounts. Each type of account may provide the respective user with unique roles, capabilities, and permissions with respect to implementing embodiments of the invention. For instance, a shipper may be provided with a shipper account that permits the shipper to access embodiments of the invention that are applicable to managing the shipment of the shipper's goods. Additionally, a carrier may be provided with a carrier account that permits the carrier to access embodiments of the invention that is applicable to managing the various requests for cost quotes received by shippers and those shipments that the carrier was selected to transport. In addition, any number and/or any specific types of accounts are provided as may be necessary to carry out the functions, features, and/or implementations of the invention. In addition, there may exist accounts either for users or vendors of the electronic resources administered by each vendor.

Description of the Method Steps Performed by the Computer Program of Embodiments As noted above, the computer program of embodiments of the invention, when executed by the processing element 16, performs the steps of the method of embodiments of the invention. In one embodiment of the invention where the user has a preexisting user account with the vendor, such steps broadly comprise the following: presenting, by an administrator and to a user, a set of vendors, wherein each vendor of said set of vendors provides a good or service, and wherein the user desires to obtain a cost of the good or service provided by each vendor; prompting the user for an authorization to access each vendor of said set of vendors to obtain the cost of the good or service provided by each vendor; receiving, by the administrator and from the user, authorization to access each vendor of said set of vendors on behalf of the user, wherein the user has a preexisting user account for each vendor of said set of vendors, and the preexisting user account is associated with identification information uniquely identifying the preexisting user account; sending, by the administrator and to each vendor of said set of vendors, the authorization provided by the user; sending, by the administrator and to each vendor of said set of vendors, a request to provide the identification information associated with the preexisting user account; receiving, from at least a portion of said set of vendors, the identification information for the respective preexisting user account; accessing, by the administrator and for each vendor for which identification information was received for the respective preexisting user account, a vendor database associated with the vendor using the identification information for the preexisting user account; obtaining, by the administrator and from the vendor database, the cost of the good or service provided by the vendor, wherein the user's identification information for the preexisting user account uniquely identifies the user during the step of obtaining, by the administrator and from the vendor database, the cost of the good or service provided by the vendor, such that the obtained cost of the good or service is based on an identity of the user; and presenting, by the administrator and to the user, the obtained cost of the good or service provided by each vendor, wherein the user is presented the obtained cost of the good or service without having to provide to the administrator or the vendor the user's identification information associated with the user's preexisting user account.

As used herein, the term "identification information" is defined as any information for identifying a user, a vendor, accounts related to a user or vendor, transactions between a user and a vendor, or products of a vendor. In detail, upon a user accessing an electronic resource of a vendor for the first time, the user may be required to provide various items of identification information to create their respective accounts. Such identification information may include any of the following: a name, such as the first name, last name, familial name, nickname, or pseudonym of the user; an authentication identifier including a string of text, such as a password, a passcode, a selection from a set of items such as pieces of text or sounds, a picture including a specific part identified in the picture, a verbal command, or any item of information known or possessed by the user and verifiable by the vendor; and contact information of the user, such as a business name, an e-mail address, a phone number, or a postal address. In embodiments of the invention, identification information may include information for creating, processing, or tracking a transaction between the user and the vendor. In this embodiment, identification information may include any of the following: an invoice number related to a single transaction occurrence; a product identifier including a number or record that relates to a specific good, service, or accessory to a good or service; and information necessary to facilitate a payment for a product, such as a credit card number or bank account number.

In embodiments of the invention, the computer program will request that the vendor "provision" the user. Provisioning the user as described herein means supplying information necessary for the user and/or the administrator to access the electronic resource of the vendor or otherwise obtain products from the vendor. In instances where the information necessary to access the vendor is related to account information, three potential scenarios arise. In a first scenario, the vendor may provision the user by creating a single account uniquely associated with the user, such that the user and/or the administrator may use the unique account to access the electronic resource associated with the vendor and/or retrieve products for the user. In such a case, the user created the account, and the account may be referred to as a preexisting user account. Also in such a case, if a second user requests connection to the same vendor, the vendor will need to create a second account unique to the second user. The preexisting user account may be associated with identification information, as defined above. In many, although not all instances, of embodiments of the invention, the identification information associated with the preexisting user account will be authentication credentials, such as username and password, used for directly accessing the electronic resource of the vendor and without accessing the electronic resource controlled by the administrator.

In a second scenario related to provisioning the user with account information, the vendor may provision the user by creating an omnibus account associated with the administrator of the computer program of embodiments of the invention, such that the administrator may use the omnibus account to access the electronic resource of the vendor on behalf of any user. Similar to a single unique user account, the administrator omnibus account may be associated with identification information that allows the administrator to access the electronic resource of the vendor; however, unlike the single unique user account, the identification information is not unique to each individual user.

A third scenario related to provisioning the user arises when the user does not have a preexisting user account with a vendor, and the administrator of the computer program of embodiments of the invention requests the vendor create a user account. In such an instance, any identification information associated with the newly created user account is received and known by the administrator.

In embodiments of the invention, the computer program will request that the user create a user provisioning account to access the electronic resource controlled by the administrator. Note that the user provisioning account between the user and the administrator is a different account than the preexisting user account between the user and the vendor. Specifically, before the user begins selecting vendors to connect with, the administrator requests the user provide user provisioning information. This user provisioning information is associated with the user provisioning account with the administrator. The user provisioning information may include the user's name, contact information, common products the user desires to obtain, payment information, and other information as described herein. This information may be utilized by the computer program during the provisioning process, as will be described later. In some instance, the user provisioning information may be the same as or at the least overlap with the identification information associated with the user account between the user and the vendor. The user provisioning account and the user provisioning information are stored by the computer program to the memory element 18 of the system 10.

In embodiments, the user may be provisioned without having to provide identification information associated with the user or with the user's preexisting account to either the administrator or the vendor. For example and as noted above, the user may have authentication credentials associated with the preexisting user account with the vendor, such as username and password. In embodiments, the user need not provide the authentication credentials to the administrator or the vendor, yet may still obtain the product. In further embodiments, the obtained product is specific to an identity of the user. As another nonlimiting example, the identification information may be a record ID associated with a preexisting user account of the user.

In the shipping industry exemplar, the identification information is a record ID that links to information about the shipper including the source and destination of an existing shipping request. In the fleet service industry exemplar, the identification information is a username and password used by a fleet owner to access quotes from the fleet servicer. In the insurance industry exemplar, the identification information is a set of descriptive information and associated categories, such that the insurance provider's website may provide rates for the person. In the digital media content industry, the identification information is a username and password for the user to access the content delivery portal.

Turning to FIGS. 2-14, a graphical user interface and general steps performed by the computer program of embodiments of the invention will be described. The program provides a first prompt 22 to the user that enables selection of one or more vendors. In conjunction with or subsequent to the first prompt 22, the computer program provides a second prompt 24 to the user for authorization, as discussed in more detail below. In embodiments of the invention, the computer program additionally verifies the user. After receiving authorization from the user, the computer program provides a third prompt 26 to each vendor that was selected by the user. The third prompt 26 requests the vendor to provision the user. Upon response by a vendor, the computer program provides a notice 28 to the user that they may access the products provided by that vendor.

Figure 2:
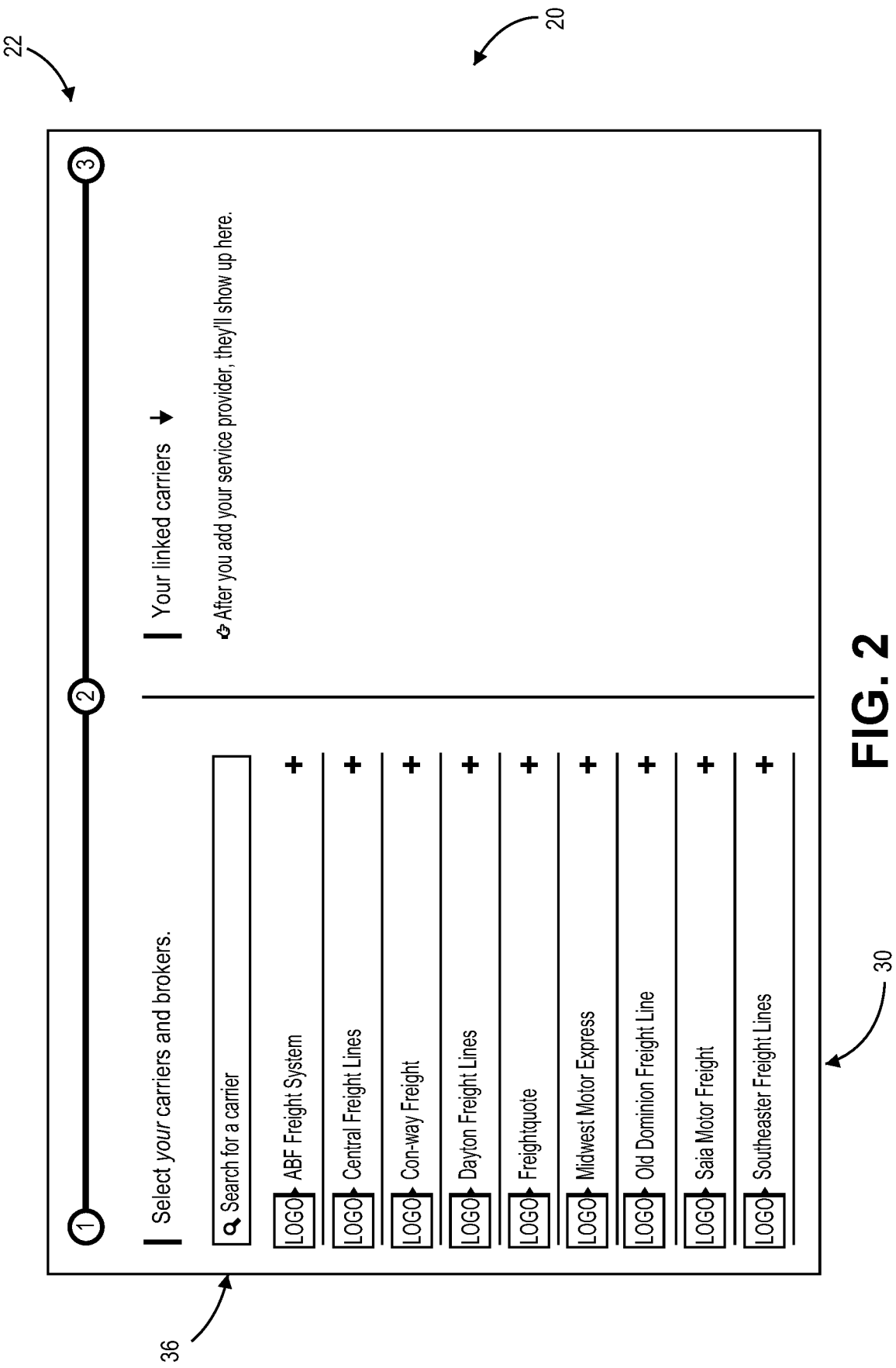
FIG. 2 is a screen capture depicting the graphical user interface of an embodiment of the invention displaying the first prompt.
Figure 3:
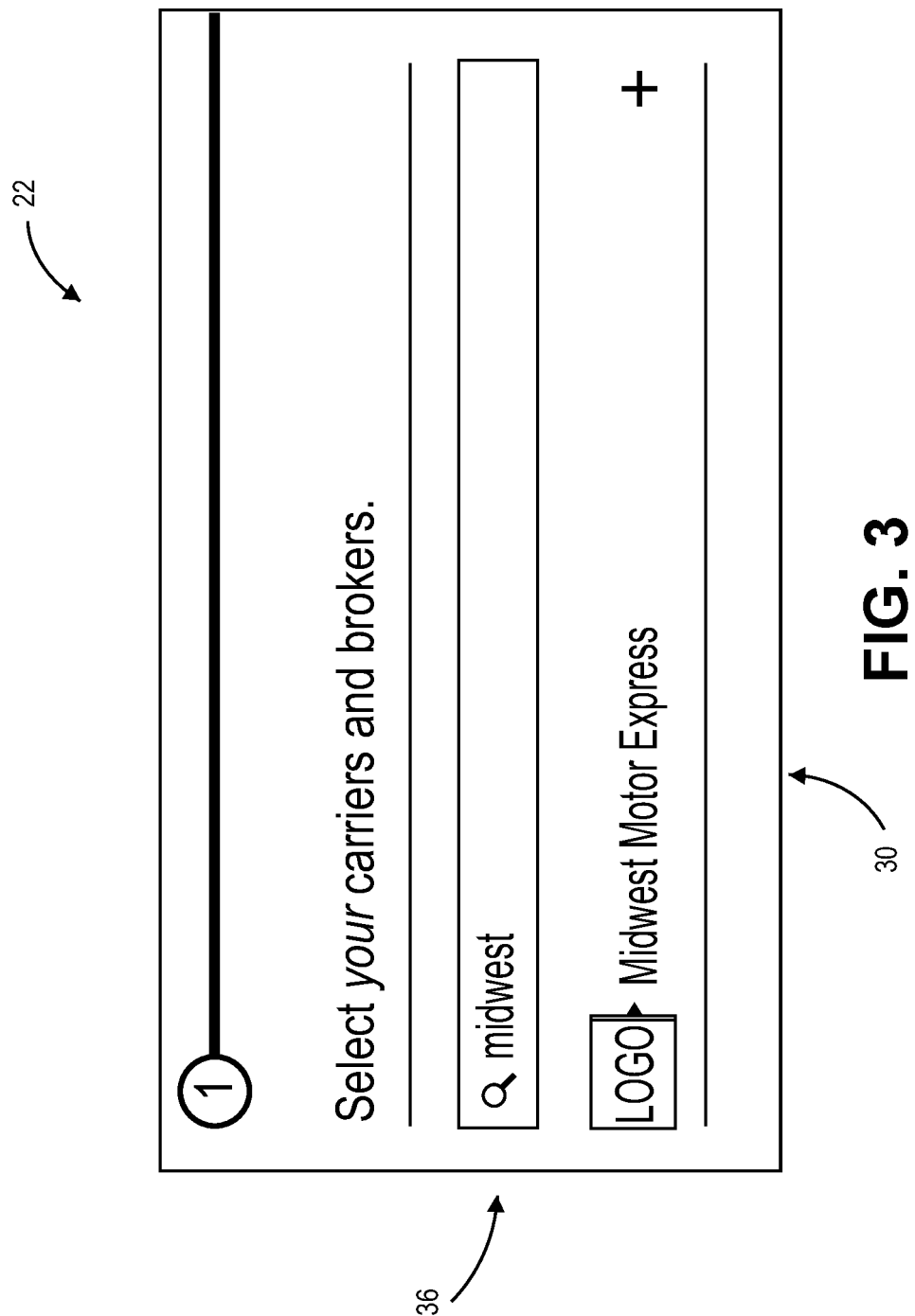
FIG. 3 is a screen capture depicting a portion of the first prompt of an embodiment of the invention after the user has provided input to a search box.
Figure 6:
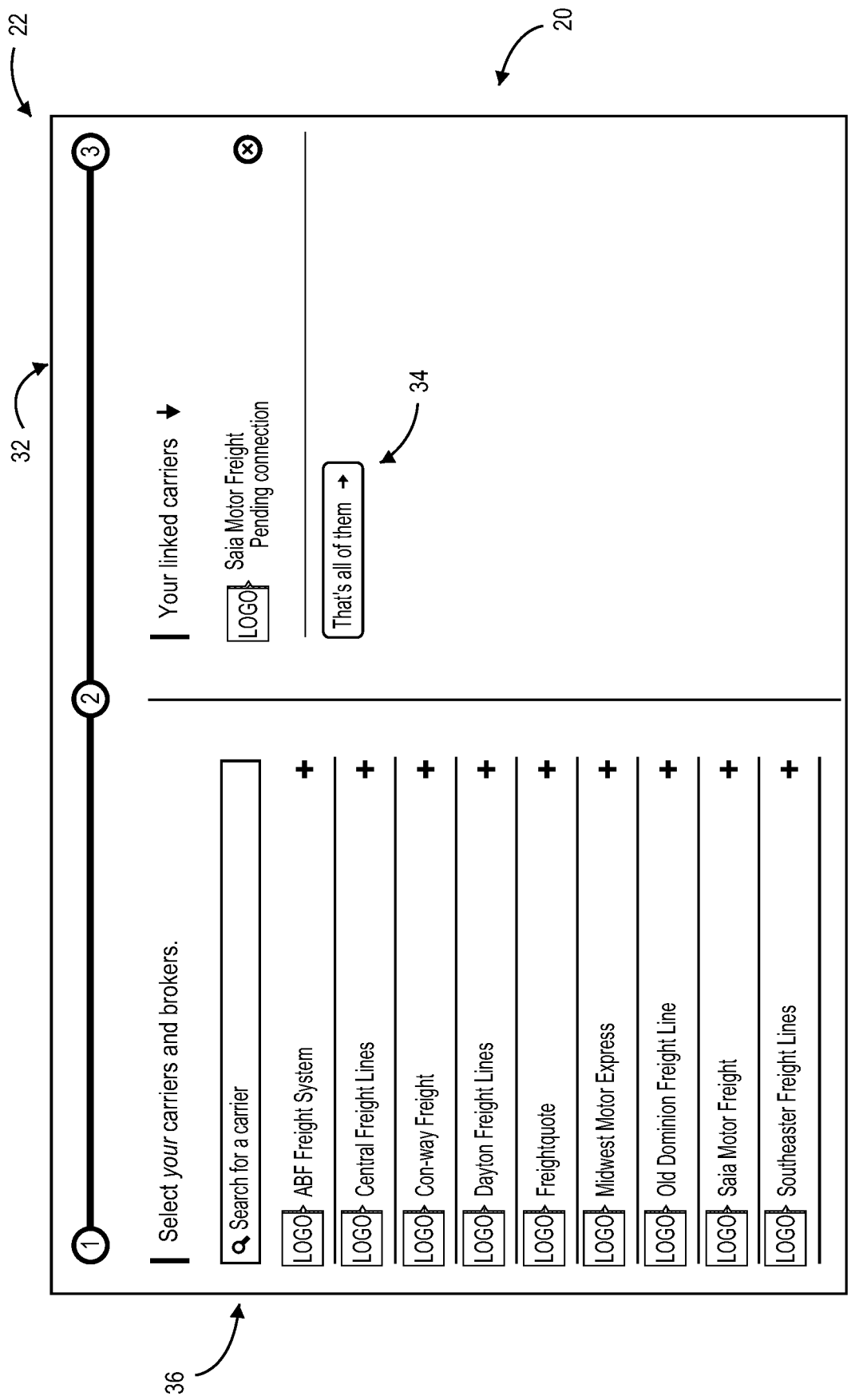
FIG. 6 is a screen capture depicting the graphical user interface of an embodiment of the invention displaying the first prompt.

As shown in FIGS. 2, 3, and 6, the first prompt 22 broadly comprises a first list (or set) of vendors 30, a second list (or set) of vendors 32, and a confirmation 34. The first prompt 22 may be in the form of a stand-alone message, such as an e-mail or a message box displayed on the GUI 20 (either through a web browser or a stand-alone local client). In embodiments of the invention, the first prompt 22 further comprises a search box 36 for narrowing the first list of vendors 30. In embodiments, the first prompt 22 further comprises an interface element for adding an additional vendor—a vendor not known by the computer program.

The first list of vendors 30 is a list of companies that provide products desired by the user. In the shipping exemplar described earlier, the first list of vendors 30 is a list of carriers that offer shipping services. The first list of vendors 30 is responsive to user input. As will be discussed later, upon the computer program receiving the first list of vendors 30 from the user, the user is prompted for authorization of each listed vendor. The user may also search for particular vendors using the search box 36, which is located proximate to the first list of vendors 30. As the user provides user input to the search box 36, the first list of vendors 30 is altered. In detail, as the user inputs the name of a vendor into the search box 36, the first list of vendors 30 displays only the vendors that match the name. The search box 36 is also receptive to partial names, such that if the user only inputs one letter, the first list of vendors 30 displays only the vendors whose names contain that letter.

The second list of vendors 32 of the first prompt 22 is a list of companies for which the user has authorized the computer program to solicit products. The second list of vendors 32 is initially empty. In embodiments of the invention, the second list of vendors 32 contains the list of vendors that was selected previously by the user. Once the user has authorized the computer program to interact with a vendor, that vendor will be added to the second list of vendors 32. In embodiments of the invention, each vendor listed in the second list of vendors 32 additionally comprises a removal element 38. The removal element 38 may include any of the following: a button, text, symbol, picture, or depiction. The removal element 38 is responsive to user input. Upon user input to the removal element 38, the computer program updates the second list of vendors 32 by removing the vendor.

Figure 4:
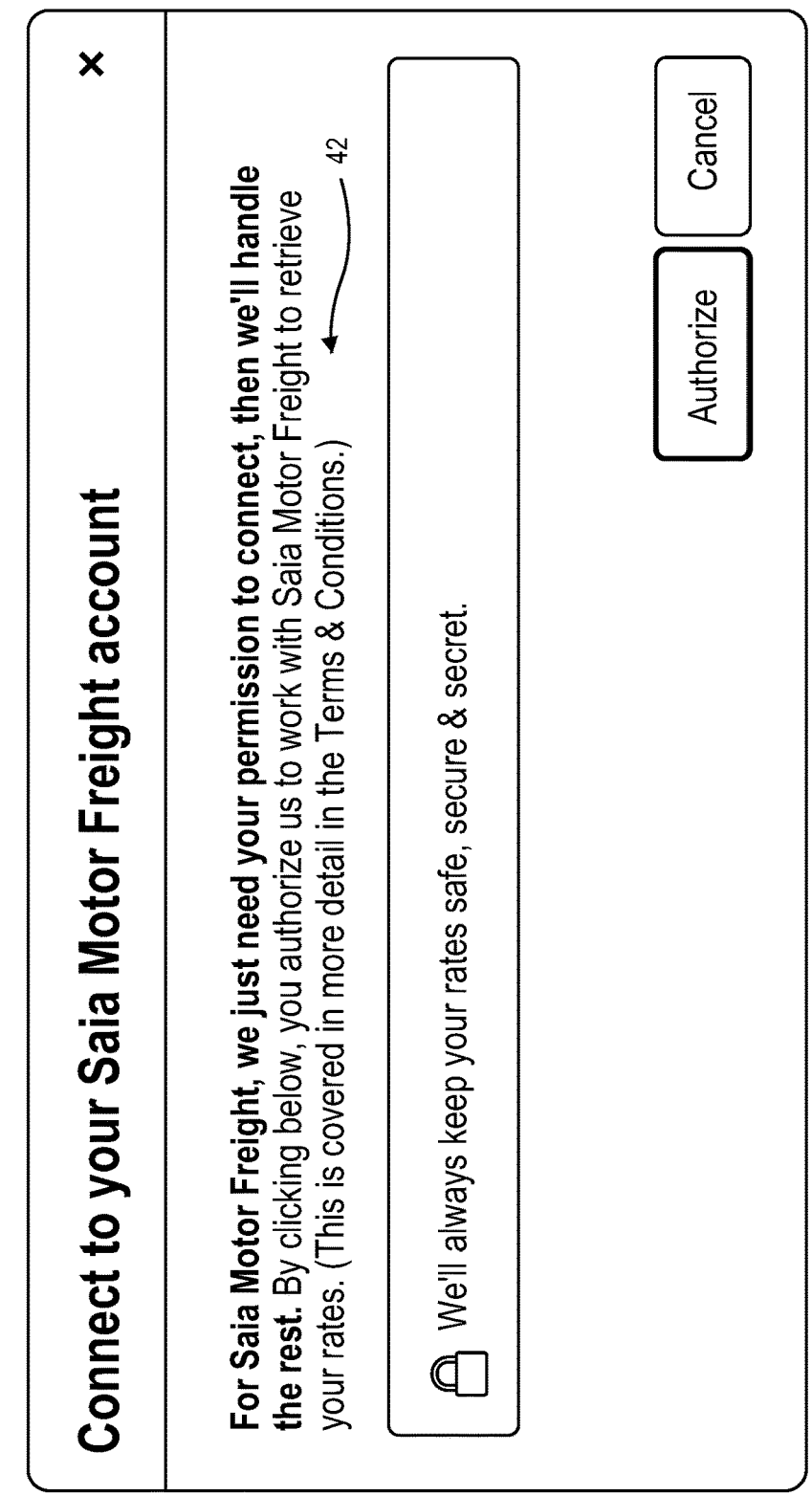
FIG. 4 is a screen capture depicting an authorization of an embodiment of the invention.

The computer program presents the second prompt 24 to the user when the user selects a vendor from the first list of vendors 30. In embodiments that further comprise an interface element for adding an additional vendor, the computer program also presents the second prompt 24 in response to user input to the interface element. An exemplary second prompt 24 is shown in FIG. 4. The second prompt 24 comprises an authorization 40. The authorization 40 is a statement that explains to the user that the computer program will work with the vendor selected by the user to provide access to the products located at the vendor's electronic resource. Additionally, the authorization provides a minimum level of security sufficient to allow the vendor to provide the administrator the identification information for the preexisting user account (or to newly create a user account in other embodiments). In embodiments of the invention, the second prompt 24 further includes terms and conditions 42 related to the usage of the authorization. The terms and conditions 42 are presented directly as text displayed by the GUI 20 or indirectly as a link. In embodiments of the invention, the second prompt 24 comprises an interface element (not depicted) to indicate to the computer program that the vendor has no previous relationship with the user.

Figure 5:
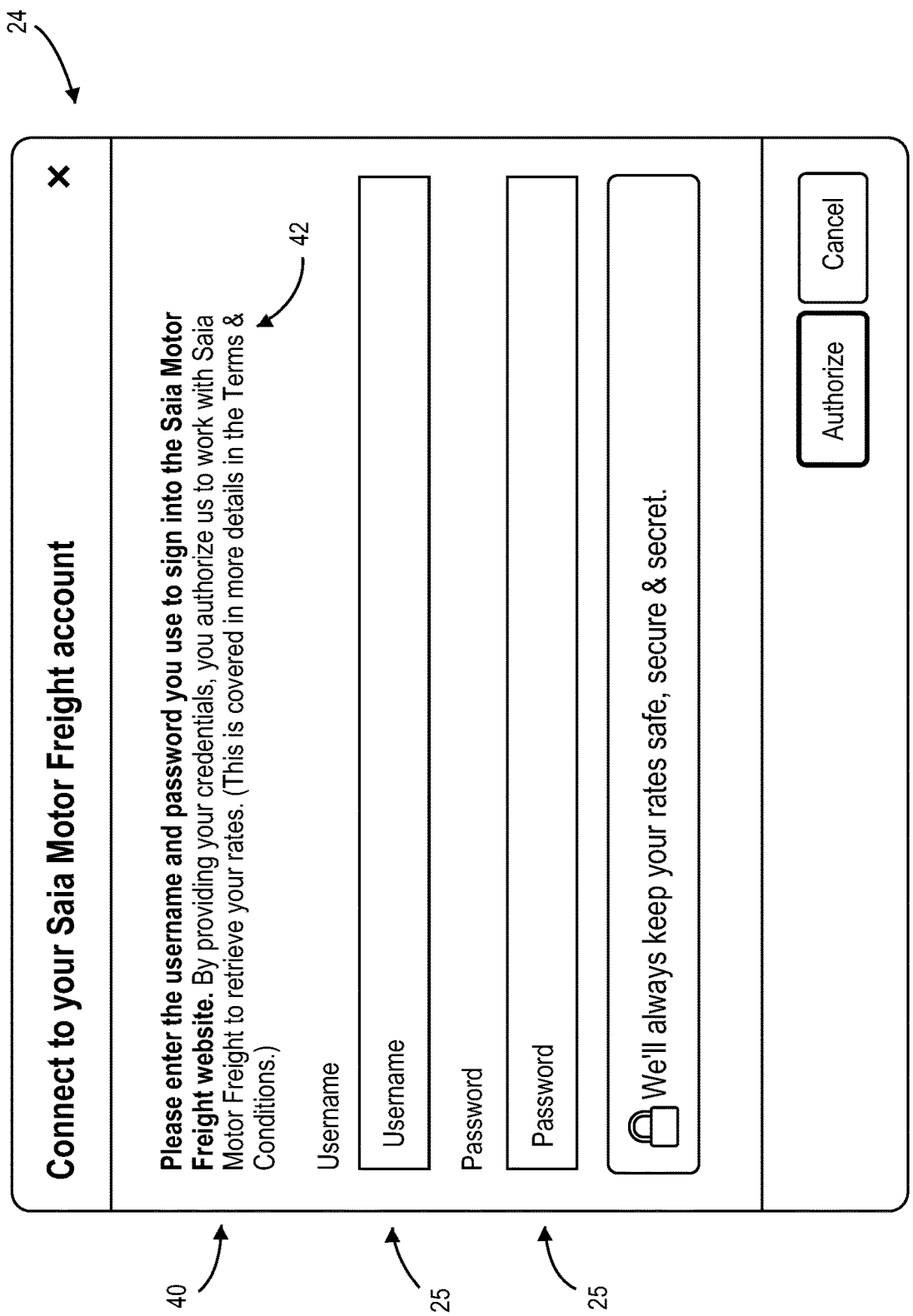
FIG. 5 is a screen capture depicting the authorization of an embodiment of the invention that includes a request for the authentication credentials of the user related to an electronic resource of a vendor.

Upon authorization from the user, the computer program will prompt the vendor to provision the user, as will be described later. In some embodiments of the invention, a vendor may be unable to provision the user without the user's identification information, such as the user's authentication credentials, and the vendor may otherwise be unable to access the user's credentials. In such an embodiment and as shown in FIG. 5, the second prompt 24 further comprises info boxes 25 for asking the user to input the credentials used by the user to connect to the electronic resource of the vendor.

Figure 7:
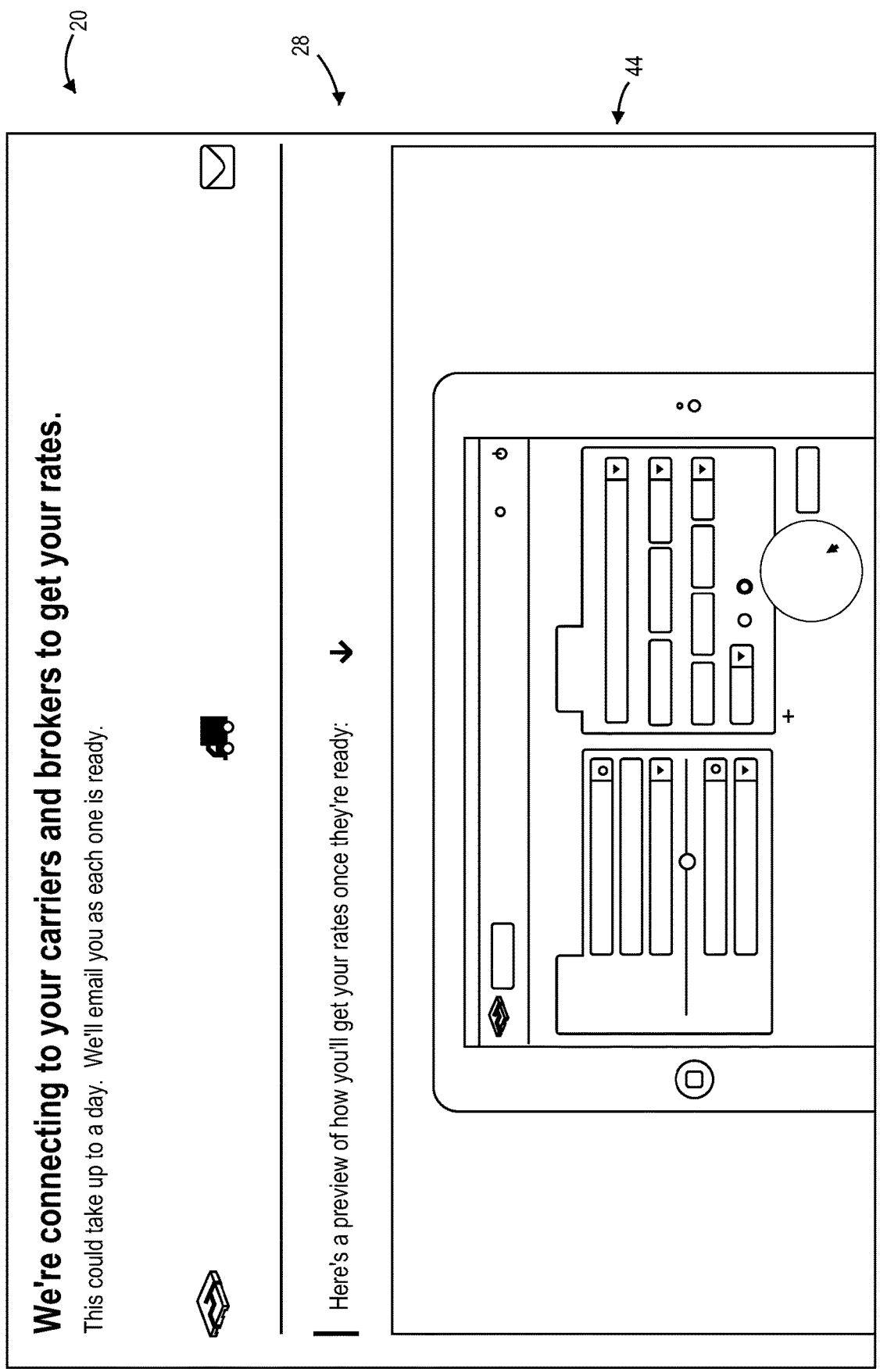
FIG. 7 is a screen capture depicting an exemplar notification to the user that the computer program will now contact one or more vendors.

As shown in FIG. 6, the confirmation 34 of the first prompt 22 is an interface element that accepts user input. Upon user input the confirmation 34 communicates to the computer program that the user is done selecting and authorizing vendors. In embodiments of the invention, upon user input of the confirmation 34 the computer program provides a notice 28 to the user. An exemplary notice 28 is shown in FIG. 7. The notice 28 informs the user that it may take a period of time before the provisioning process is complete. In embodiments, the notice 28 also displays a preview 44 of the interface the user will access after the provisioning process is complete.

In embodiments of the invention and upon user input of the confirmation 34, the computer program verifies an identity of the user to prevent spoofing and to otherwise provide a layer of security in the provisioning process. Verification of the identity of the user may be performed by various verification methods and using a weighting for each of the verification methods and an identity threshold. The verification methods may include the following: calling the user's company at a listed main telephone line and verifying the user's employment at the company; doing a reverse Domain Name Service lookup and verifying that the user's Internet Protocol address is related to the user's e-mail address or company website; verifying that the user's e-mail address is related to the company name; sending an e-mail to the user, the e-mail containing a link, and requiring the user to click on the link; measuring the response time and input rate of the user to the computer program and verifying the response time and input rate are capable of being produced by a human; or performing a financial transaction involving a bank account accessible by the user and then having the user verify the amount of the financial transaction. It should be appreciated that the verification methods listed above are not exhaustive and are stated for exemplary purposes.

The weighting factor is a value given to each verification method. The value represents how likely the specific verification method is in determining the identity of the user. In embodiments of the invention, each verification method has the same weighting factor. In other embodiments, each verification method has a different weighting factor. The identity threshold is a number that indicates to the computer program that the user identity is verified—that the user is who they say they are. If the score of the user is above the identity threshold then the user is verified. If the score of the user is not above the identity threshold, then the user is not verified. To determine the score of the user, each verification method is multiplied by the weighting factor of that verification method and summed. If the user is verified, then the computer program provides the third prompt 26 to the vendors selected by the user.

Figure 10:
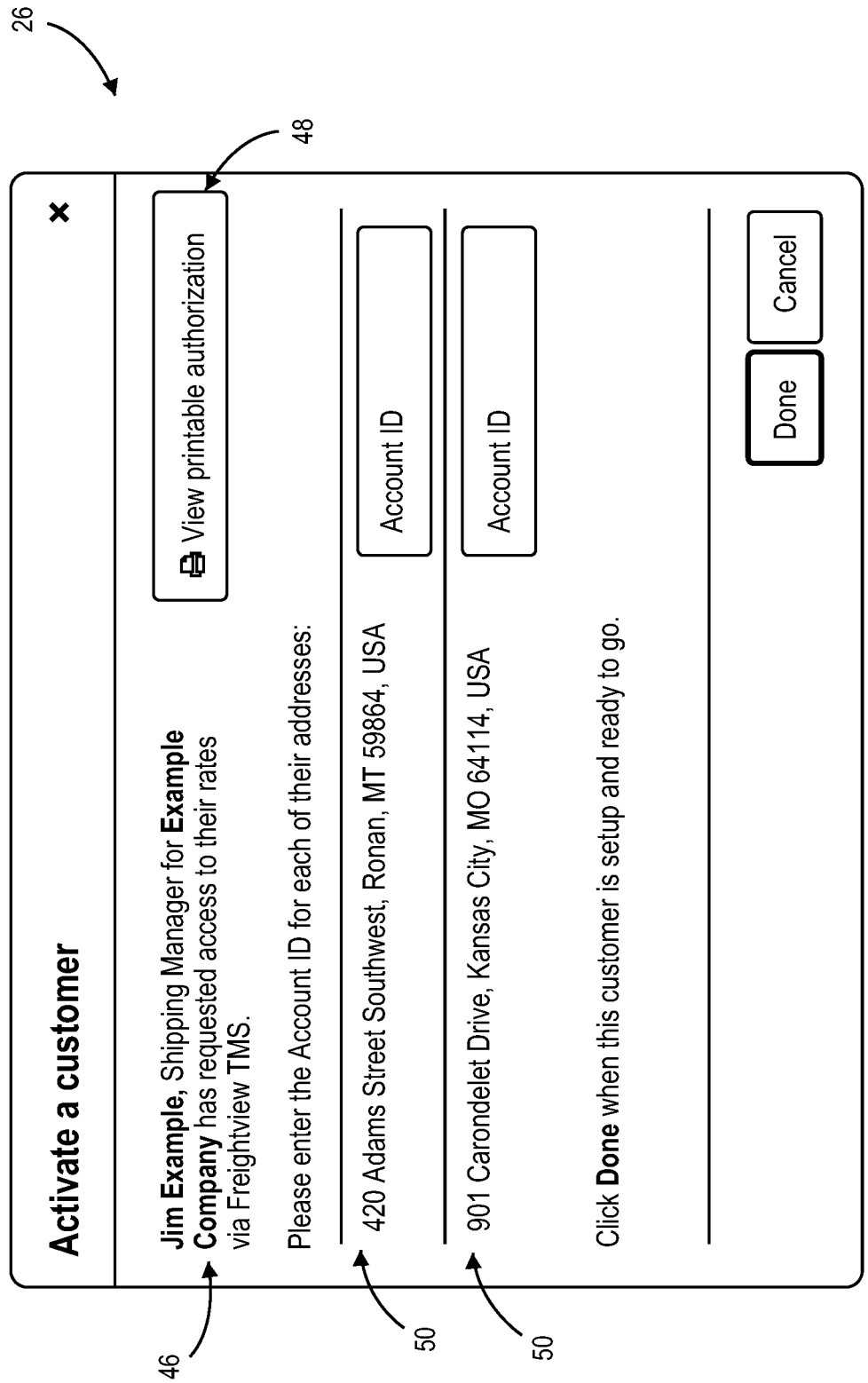
FIG. 10 is a screen capture depicting the graphical user interface of an embodiment of the invention displaying the third prompt.

Turning to FIGS. 8-13, the third prompt 26 provided by the computer program is sent to each of the vendors on the second list 32. The third prompt 26 is a request for the vendor to provision the user. As shown in FIGS. 10, 12, and 13, the third prompt 26 comprises a notice to the vendor 46, an authorization element 48 from the user, and at least one data question 50. As noted above and in embodiments of the invention, the user may select a vendor with which the user has no previous relationship. In this embodiment the third prompt further comprises the identification information (not depicted) of the user necessary for the vendor to create an account for the user. The third prompt may be displayed in any of the following formats: an e-mail, a text or SMS message, or any other electronic communication; displayed by the GUI 20 in a web browser running on a computing device 12 of the vendor; or displayed by the GUI in a dedicated client running on a desktop or mobile computing device 12 of the vendor.

Figure 8:
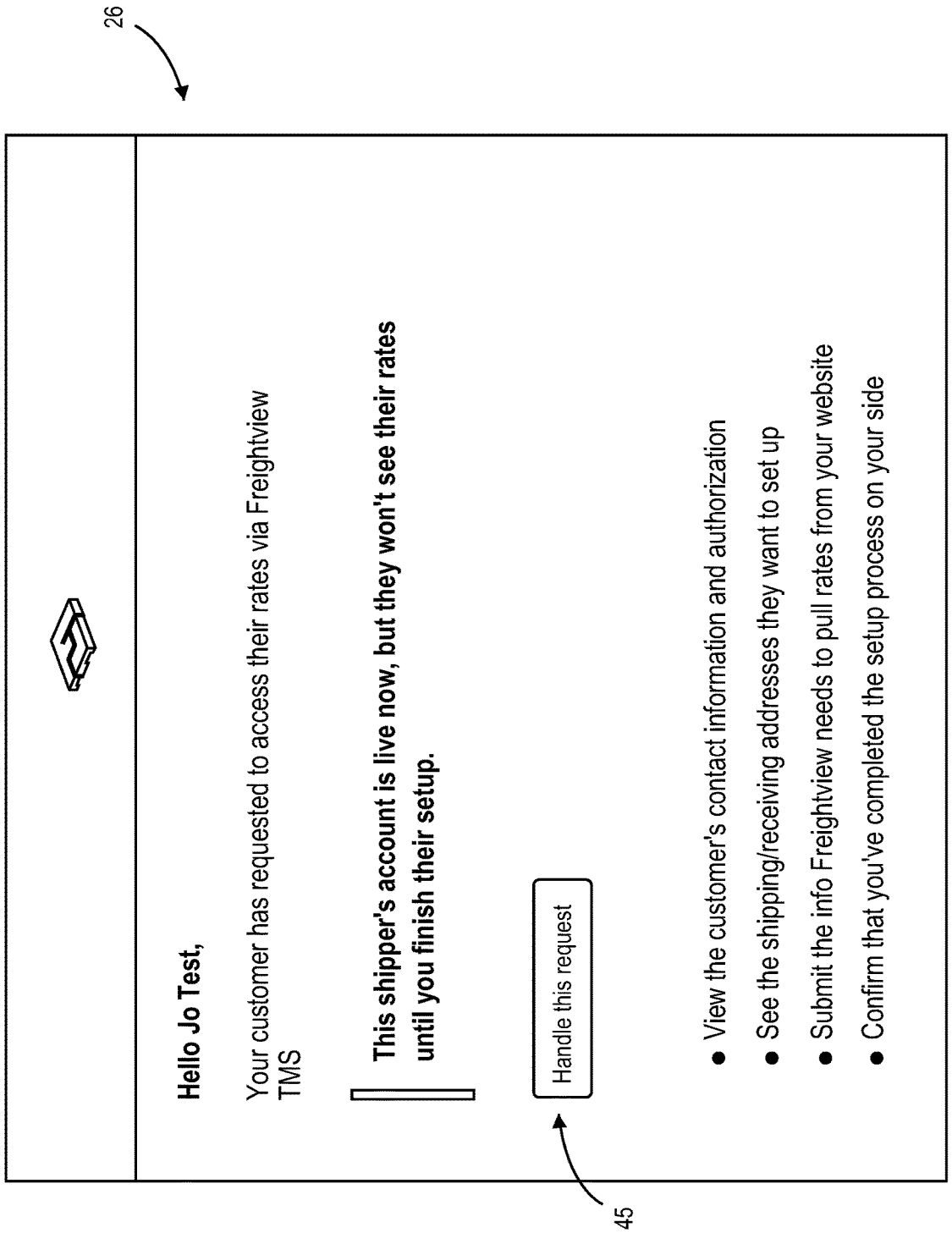
FIG. 8 is a screen capture depicting a third prompt of an embodiment of the invention directed to a vendor.

In embodiments, the third prompt 26 may not be initially displayed in the GUI 20 of the computer program (as in the case of an e-mail). In this embodiment and as shown in FIG. 8, the third prompt further comprises a link 45 to launch an instance of the GUI 20 on a computer device 12 of the vendor. In other embodiments, the third prompt 26 may comprise multiple prompts organized through an interface 52. An exemplar interface 52 is shown in FIG. 9. This interface 52 is displayed in a web browser running on a computing device 12 of the vendor, or displayed by the GUI 20 in a dedicated client running on a desktop or mobile computing device of the vendor.

The notice 46 of the third prompt 26 is text that explains to the vendor that the user desires the computer program to connect to the vendor's electronic resource. The notice 46 lists the name of the user and the name of the user's company. In embodiments of the invention, the notice 46 further states the role or title that the user holds at the company. In embodiments of the invention, the notice 46 further states the specific good or service of the vendor that the user has requested. In embodiments of the invention, the notice 46 includes a telephone number or e-mail address. The vendor may use the telephone number or e-mail address to call the administrator and verify the source of the third prompt 26.

The authorization element 48 of the third prompt 26 is an interface element that accepts user input from the vendor. Upon receipt of user input and as shown in FIG. 11, the computer program displays the text of the authorization 40. The text of the authorization 40 may include an electronic signature of the user and a notice indicating the validity of the electronic signature. In embodiments of the invention, the authorization 40 further comprises text that describes a specific good or service offered by the vendor that the user has requested. The authorization provides a minimum level of security sufficient to allow the vendor to provide the administrator the identification information for the user account. In other embodiments, the authorization element 48 is not an interface element but the text of the authorization 40.

The data question 50 of the third prompt 26 is one or more interface elements along with corresponding descriptions. The interface elements are responsive to user input by the vendor. The interface elements may include any or all of the following: text input boxes, radio buttons, search boxes, scroll buttons, interactive maps, or date/time pickers. The data question 50 asks the vendor to supply identification information for use by the computer program to connect to and communicate with the electronic resource of the vendor. In embodiments where the user has added an additional vendor, the data question 50 comprises an initial communication, as discussed below.

The identification information used to answer the data question 50 may vary depending on multiple factors including any of the following: the industry, the type of good or service offered by the vendor, the type of agreement between the user and the vendor, or the type of electronic resource of the vendor. In the shipping industry exemplar, a carrier offers the service to a shipper of shipping goods from a source to a destination. The carrier may work with more than one shipper that needs goods shipped from the same source to the same destination. When the carrier and the shipper form the agreement to ship a good from the source to the destination, they negotiate a price. Each shipper stored in the system of the carrier has a previously negotiated rate different from all other shippers. For the computer program to accurately retrieve from the carrier's system (the electronic resource of the vendor in this example) the rate of the shipper (the user), the carrier (the vendor) must provide a record ID that corresponds to the shipper. Thus, in this example, the identification information used to answer the data question 50 includes the record ID of the shipper. When the carrier provides to the computer program a response to the data question 50, the answer will include the record ID of the shipper, such that the computer program may interface with the electronic resource of the carrier. For this example, identification information associated with the preexisting user account is the record ID, and it is the record ID that is received by the administrator and from the vendor to obtain the cost of the shipment for the user.

The initial communication is information directed to the vendor that explains the function of the computer program and steps the vendor must take to establish a connection between the computer program and the electronic resource of the vendor. The information may include any of the following: a message explaining how the computer program works with the electronic resource of the vendor to pull data and present it to the user; a request to create a vendor account for the computer program, wherein the vendor account is between the administrator of the program and the vendor; and a contact e-mail or telephone number in the event that the vendor has additional questions about the computer program. The vendor must then configure their electronic resource to establish a connection with the computer program.

When the vendor answers the third prompt 26 the computer program will receive a response from the vendor. At this point the computer program will verify its ability to connect with the electronic resource of the vendor. The computer program will use the response provided by the vendor and establish a connection. In particular, the program will access, by the administrator and for each vendor for which identification information was received, a vendor database associated with the vendor. The program will then obtain the cost of the good or service provided by the vendor and, in embodiments, specific to the user.

In particular and as also described below, the product (including the cost of the good or service) provided by the vendor to the administrator may be specific to the user or may be generally applicable to any user. Reference to the provided product being specific to the user is not intended to require that the user be the only person or entity that receives the product from the vendor (e.g., receives a particular cost for the good or service), but rather the product supplied by the vendor to the administrator and in response to the data question 50 is based on a user parameter. In embodiments of the invention, the user parameter may be an identity of the user, a location of the user, a volume of business the user conducts with the vendor, a type of product the user obtains from the vendor, or a location of a source and destination of the most common routes of shipments requested by the user (in the shipper/carrier exemplar). The above list is non-exhaustive and may include other factors or criteria associated with the user.

The vendor database may comprise a database accessible by the administrator and providing product information, such as product pricing (e.g., the cost of a good or service), product descriptions or specifications, and product availability. A vendor will often provide products directly by granting access to product information presented at the vendor's electronic resource. Alternatively, the vendor database may be information obtained from the electronic resource of the vendor, such as via a data-scraping process described below. In yet further embodiments, the vendor database may be information accessible by the administrator and via an application programming interface (API) with the electronic resource of the vendor. As can be appreciated, if the vendor has an API that allows the administrator to access the vendor database, then the administrator may use the API to provide the identification information for a particular user and obtain the product information.

In embodiments using the data-scraping process, the administrator executes the data-scraping process at the electronic resource of the vendor to retrieve the product (including the price of a product) provided by the vendor. The administrator accesses the vendor's electronic resource, such as by opening a web browser and loading the website of the vendor that contains the product. The data-scraping process may provide the authentication credentials of the user to the electronic resource and perform navigation and querying of the interface to locate the information about the product. In embodiments, the data-scraping process then reads the source code of the electronic resource to obtain text that contains the information about the product. In other embodiments, the data-scraping process runs an optical character recognition (OCR) process on an image provided by the electronic resource to obtain text that contains the information about the product. In either of the directly aforementioned embodiments, the data-scraping process then parses the text to obtain the information about the product. The data-scraping process then provides the product to the user.

Figure 14:
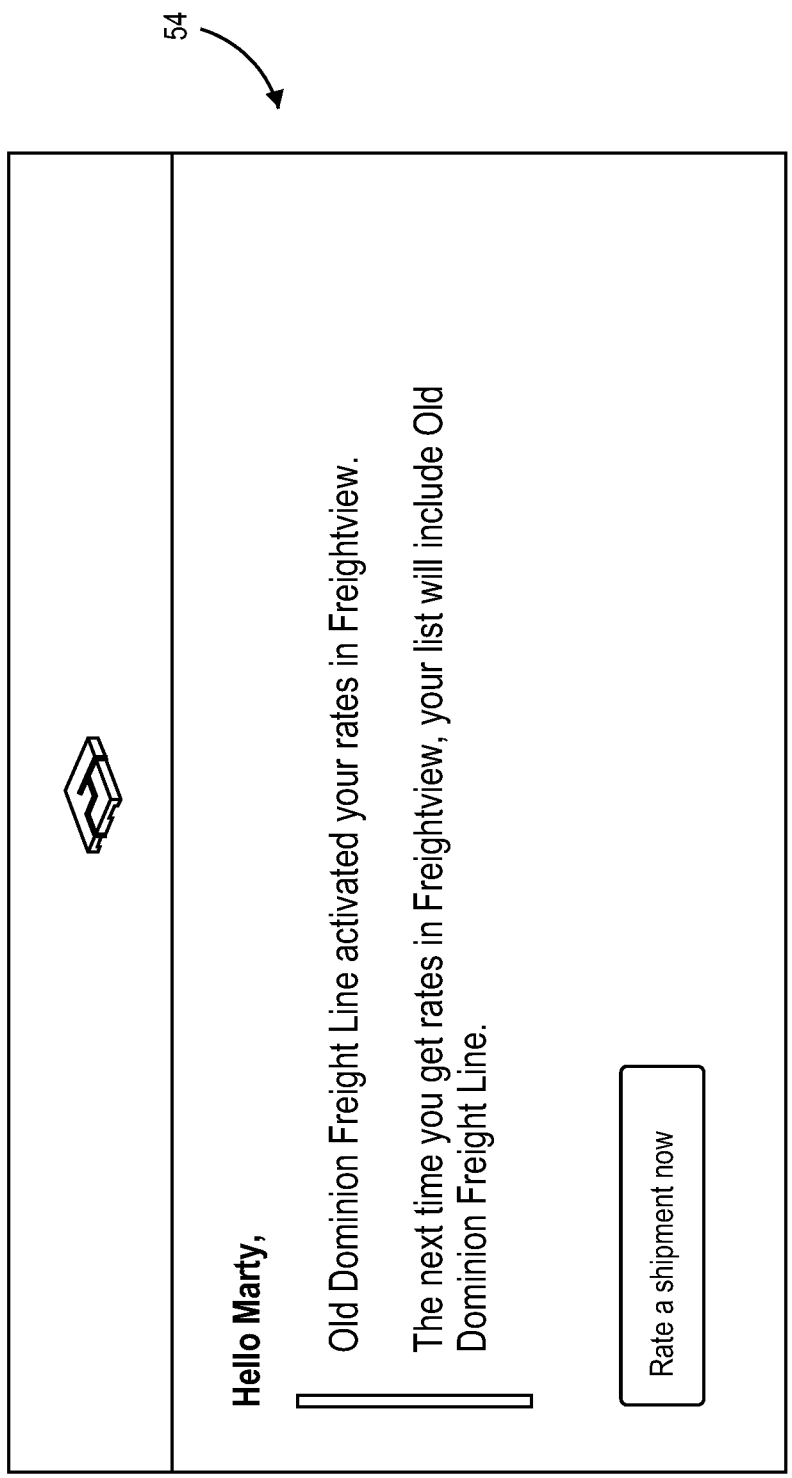
FIG. 14 is a screen capture depicting an exemplar notification to the user that the vendor has provisioned the user.

After the administrator has obtained the product, as shown in FIG. 14, the computer program will send a notice 54 to the user that informs the user that the vendor's products are available through the computer program. The user can then access their user provisioning account at the electronic resource hosted by the administrator to view the product. In particular, if the user selected provisioning for multiple vendors, the products for each vendor will be viewable at the centralized resource provided by the administrator.

In embodiments of the invention, the computer program also connects a user to vendors not selected by the user. In detail, after a user has selected from the first set of vendors and the vendors have provisioned the user, the computer program sends a notice to the user 54 and the user will access the computer program via the user provisioning account. Once the user is connected to the computer program, the user may view the products provided by the vendors. The computer program may prompt for permission from the user before connecting to vendors not selected by the user. When the computer program connects to vendors not selected by the user, the computer program again goes through the provisioning process, as described above. After the provisioning process and upon receiving an answer (e.g., identification information) from the vendor, the computer program will verify its ability to connect with the electronic resource of the vendor not selected by the user. In certain embodiments, the computer program will then notify the user that new vendors offer products matching the requirements of the user. In other embodiments, the computer program will not notify the user but will update the displayed products to include those from the newly provisioned vendor that was not selected by the user.

In embodiments of the invention, the computer program also provides advertisements to the user based upon information gathered from the user's usage of the computer program. In detail, the computer program may use information provided by the user when the user initially begins using the system. This information may include the user provisioning information supplied by the user during the creation of the user provisioning account, or this information may include the identification information associated with each respective user account with a vendor.

The computer program may use this information to suggest new products to the user. For example, and referring to the digital media content industry exemplar above, the computer program may prompt the user to provide identification information related to preferences of the user. The computer program may request the user select from one or more genres of movies that the user prefers to watch or actors that the user enjoys. The computer program will use this information to enable vendors to advertise and provide products to the user that relate to the genres chosen by the user. In addition, the computer program may collect identification information from the vendors. Again using the digital media content industry exemplar, the user requests that the computer program connect to NETFLIX. During the provisioning process the computer program receives the username and password from NETFLIX along with a recently watched history. The computer program is then able to provide information about the viewing habits to other vendors having movies and television shows that the user enjoys viewing.

The computer may also use this information to provide vendors with feedback that may assist in garnering more business from a user. In detail, the program records transactions between the users and vendors and may analyze this information and detect trends based on these transactions. In embodiments of the invention, the computer program may then provide to a vendor information regarding the transactions, including any of the following: products the vendor provides that are successful in a specific market segment of users; products the vendor provides that are not successful in a market segment; trends regarding purchasing habits for individual or groups of users.

Figure 15:
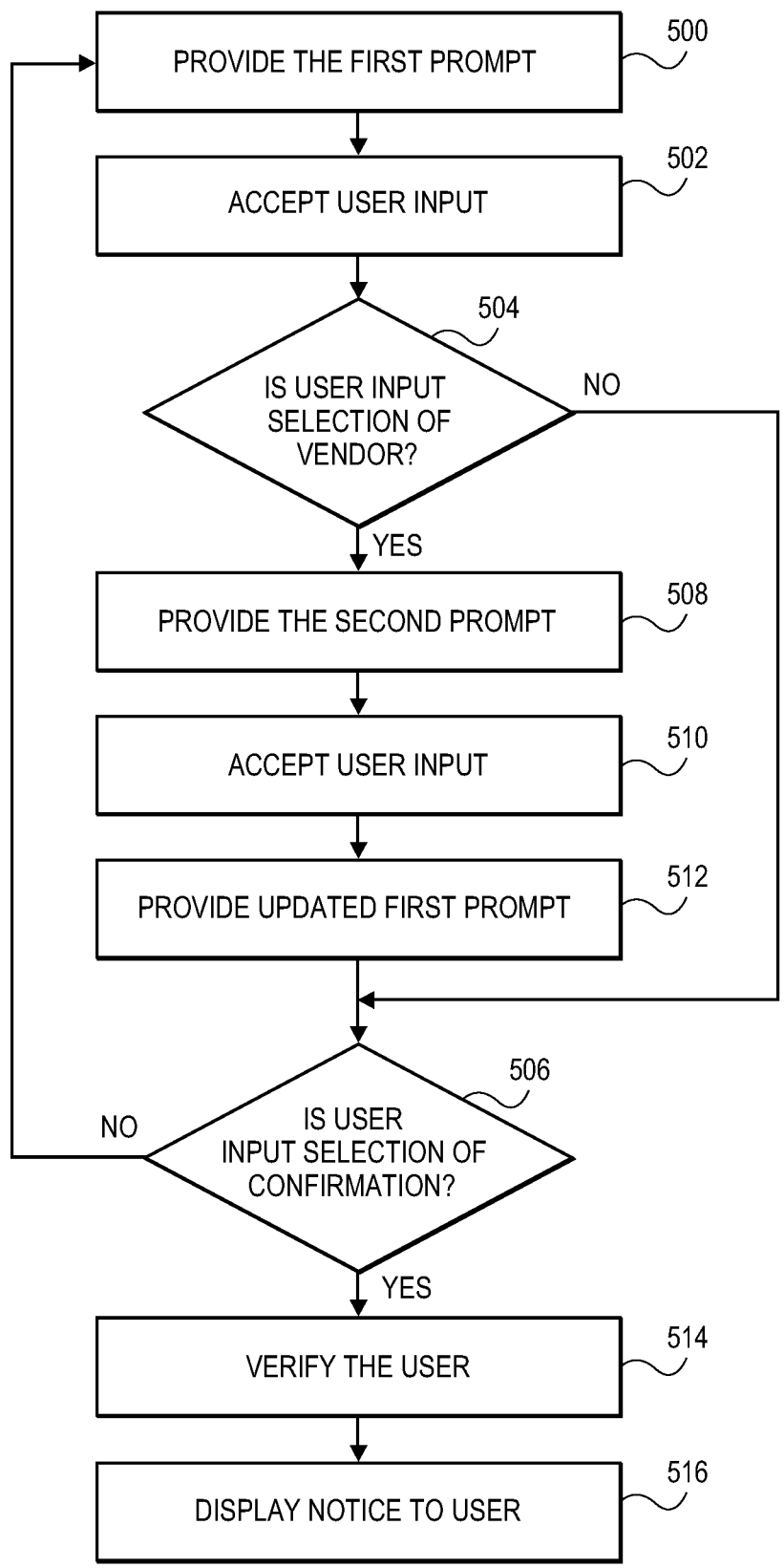
FIG. 15 is a flow diagram depicting a method of embodiments of the invention for providing the first prompt and second prompt to a user.
Figure 16:
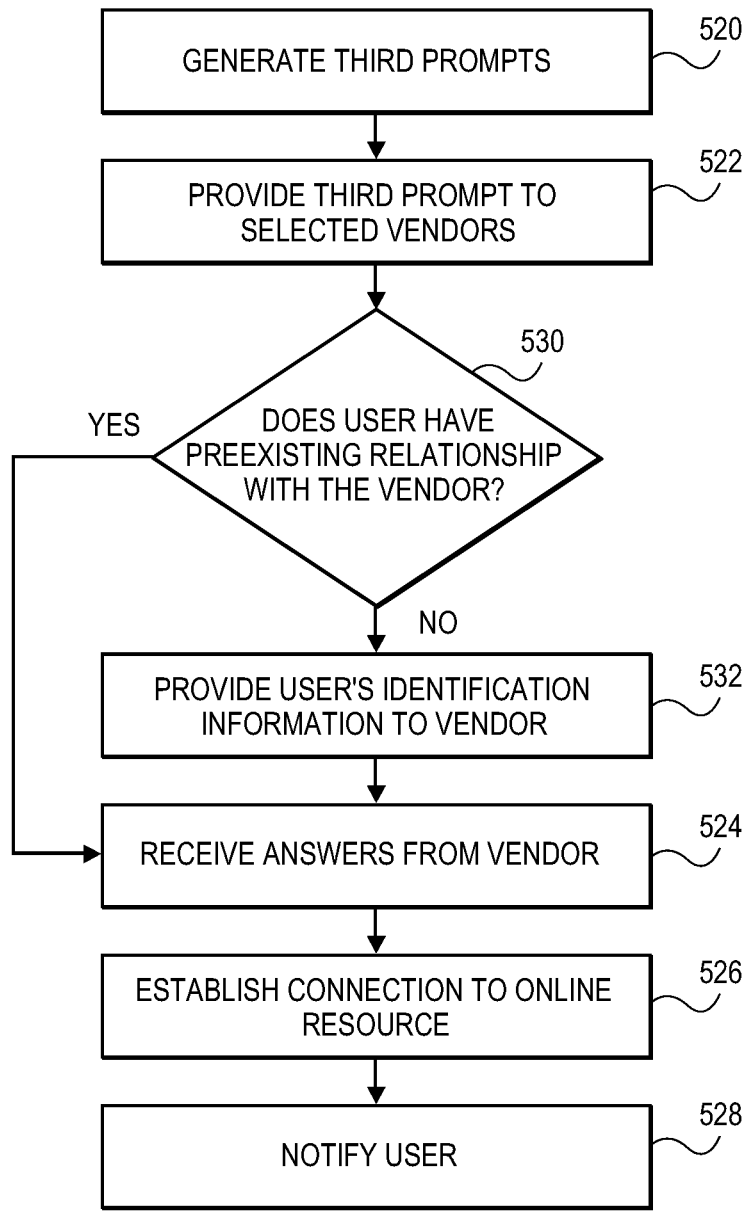
FIG. 16 is a flow diagram depicting a method of embodiments of the invention for providing the third prompt to a vendor.

Turning now to FIGS. 15 and 16, execution of the computer program of embodiments of the invention includes execution of various methods. Because multiple users may be updating information stored, displayed, and acted upon by the computer program, information displayed by the computer program is displayed in real-time. "Real-time" as defined herein is when the processing element of the system 10 performs the steps less than every 1 second, every 500 milliseconds, every 100 milliseconds, or every 16 milliseconds.

The method of embodiments of the invention for generating and providing the first and second prompts broadly comprises the following steps: providing the first prompt 500, accepting user input 502, determining if the user input is the selection of a vendor 504, and determining if user input is the selection of the confirmation 506. If the user input is the selection of a vendor, this method additionally comprises the following steps: providing the second prompt 508, accepting user input 510, and providing an updated first prompt 512. If the user input is the selection of the confirmation, this method additionally comprises the following steps: verifying the user 514, and displaying the notice to the user 516.

The method of embodiments of the invention for generating and providing the third prompt broadly comprises the following steps: generating the third prompt 520 for each vendor selected by the user, providing the third prompt 522 to each vendor, receiving a response with answers 524 from each vendor, establishing a connection 526 to each vendor's electronic resource, and notifying the user 528. The method additionally comprises the step of determining if the user has selected a vendor with whom they have no preexisting relationship 530. If the user has selected a vendor with whom they have no preexisting relationship, the method additionally comprises the step of providing the user's identification information to the vendor 532. If the user has added a vendor not known by the computer program, the step of generating the third prompt 520 will include the initial communication.

Operation and use of the system 10 with respect to a particular industry example will now be described. The below example is not intended to be limiting.

The user is a shipper, the shipper manufacturers parts for automobiles and needs those parts shipped to various automobile manufactures and automotive parts stores across the United States. The vendors are various carriers that provide a shipping service. The carriers pick up and deliver parts from one destination to another across the United States.

The shipper has never used the computer program of the system 10 before. Up until now the shipper has conducted transactions with two carriers without use of the computer program. The first carrier is a national transportation company ("company") that serves the entire United States. The second carrier is a local independent trucker ("trucker") that operates in the region of the shipper. The shipper primarily uses the company to ship parts to the shipper's customers but will use the trucker every few weeks for certain shipping transactions.

The company has an electronic system and runs a website where users may log in and obtain quotes on shipping rates from the company. The company quotes each shipper differently and stores the rates it charges shippers in its electronic system. The shipper obtains quotes and communicates with the company by telephone. Though the shipper has never logged in to the website, the company has created an account for the shipper and stored it in the electronic system.

The trucker has an electronic system but does not have a customer-facing website where users may receive quotes on shipping rates from the trucker. The trucker uses a task-tracking program hosted by an unrelated third party. The trucker normally takes e-mails from potential users and logs into a local client on his computer to access the hosted task-tracking program where users are stored.

The shipper begins using the computer program of embodiments of the invention by creating a user provisioning account and providing user provisioning information. The shipper is then presented the first prompt 22 with the first list of carriers 30 including the trucker and the company. The shipper selects the name of the trucker, and the computer program provides the second prompt 24 that requests authorization to connect with the trucker. The shipper approves the authorization, and the computer program provides an updated first prompt 22 with the first list of carriers 30 and a second list of carriers 32 including the trucker. The shipper selects the name of the company, and the computer program provides the second prompt 24 again. This time the second prompt 24 requests authorization to connect with the company. The shipper approves the authorization, and the computer program provides an updated first prompt 22 with the first list of carriers 30 and a second list of carriers 32 including the company and the trucker.

The shipper selects "confirm," and the computer program displays a notice to the shipper 28. The notice 28 informs the shipper that the selected carriers may take some time to provision the shipper and also provides a preview 44 of accessing the computer program after the provisioning process is complete. The computer program now sends a third prompt 26 to the company and a third prompt 26 to the trucker.

The third prompt 26 to the company includes a request for a unique record the computer program can utilize to access data related to the shipper, i.e., the program request identification information from the company and trucker and specific to the shipper. The company provides the row identifier of the client database corresponding to the shipper to the computer program. The third prompt 26 to the trucker includes a request for a username and password created for accessing the rates of the shipper. The trucker creates a new user that gives access to records of the shipper and provides the username and password of the user to the computer program.

The computer program verifies that it can connect to the company's system and retrieve records relating to shipment quotes and then emails the shipper. The e-mail states that the shipper may now view rates in the computer program and the rates will include the shipment quotes from the company. The computer program then verifies that it can connect to the trucker's system and retrieve records relating to shipment quotes and then emails the shipper. The e-mail states that the shipper may now view rates in the computer program and the rates will include the shipment quotes from the trucker. Each e-mail sent by the computer program provides a link to a website provided by the computer program. The website will allow the shipper to view shipment quotes from multiple carriers and track any existing shipments being performed by carriers.

Although the invention has been described with reference to the embodiments illustrated in the attached drawing figures, it is noted that equivalents may be employed and

The invention claimed is:

1. One or more non-transitory computer-readable media storing computer-executable instructions that, when executed by a processor, perform a method of facilitating secure transactions, the method comprising the steps of:
presenting, via a user interface, to a user, a set of vendors and information associated with a good or service provided by the set of vendors;
receiving, by an administrator, authorization to access each vendor of said set of vendors on behalf of the user, wherein the user has a preexisting user account for each vendor of said set of vendors, and the preexisting user account is associated with identification information uniquely identifying and verifying the association of the user with said preexisting user account;
presenting, to the user by the user interface, the information associated with the good or service without having to provide to the vendor the identification information associated with the preexisting user account;
receiving, from the user, a response selecting a vendor; and
measuring a response time and an input rate of the user associated with the result to verify that the user input is produced by a human.

2. The method of claim 1, wherein authorization to access each vendor of said set of vendors is a confirmation by the user that the information associated with the good or service may be obtained on behalf of the user.

3. The method of claim 2, wherein the authorization provides a minimum level of security sufficient to allow the vendor to provide the identification information for the preexisting user account.

4. The method of claim 1, wherein the preexisting user account was created by the user.

5. The method of claim 1, wherein the identification information uniquely identifying the preexisting user account is an authentication credential for the user.

6. The method of claim 5, wherein the authentication credential comprises a user name and a password or a passcode.

7. The method of claim 1, wherein the identification information enables the user to directly access an electronic resource associated with the vendor.

8. The method of claim 1,
wherein the user is associated with at least one user parameter,
wherein the obtained information associated with the good or service is based on said at least one user parameter, and
wherein the user parameter is selected from the group consisting of: a location of the user, a volume of business the user conducts with the vendor, and a type of product the user obtains from each vendor.

9. The method of claim 1,
wherein the information associated with the good or service is accessed via a vendor database,
wherein the access is performed by scraping an electronic resource associated with the vendor.

10. The method of claim 1,
wherein the information associated with the good or service is accessed via a vendor database,
wherein the access is performed by communicating with an application programming interface administered by the vendor.

11. The method of claim 1, further comprising the step of verifying an identity of the user by comparing a name of the user with at least one of a web site address or a contact information of the user.

12. One or more non-transitory computer-readable media storing computer-executable instructions that, when executed by a processor, perform a method of facilitating secure transactions, the method comprising the steps of:
presenting, in the user interface, to a user, a plurality of vendors and information associated with a good or service provided by at least one of the plurality of vendors;
receiving, from the user, authorization to access each vendor of said plurality of vendors on behalf of the user,
wherein for at least a first portion of the plurality of vendors, the user has a preexisting user account for said first portion of the plurality of vendors, and the preexisting user account is associated with identification information uniquely identifying and verifying the association of the user with said preexisting user account;
creating, with each of a second portion of the plurality of vendors, an omnibus account on behalf of the user, wherein the omnibus account is associated with omnibus identification information uniquely identifying the omnibus account,
wherein the user is presented the information associated with the good or service without having to provide the user's identification information associated with the user's preexisting user account;
receiving, from the user, a response selecting a vendor; and
measuring a response time and an input rate of the user associated with the result to verify that the user input is produced by a human.

13. The method of claim 12, wherein the user is one of a plurality of users, and the omnibus account for each of the second portion of the plurality of vendors may be used to obtain the information associated with the good or service for each of the plurality of users.

14. The method of claim 12, wherein the preexisting user account was created by the user.

15. The method of claim 12, wherein the identification information uniquely identifying the preexisting user account is an authentication credential for the user.

16. The method of claim 12, wherein the identification information for the preexisting user account enables the user to directly access an electronic resource associated with the at least one of the plurality of vendors.

17. The method of claim 12,
wherein the user is associated with at least one user parameter,
wherein the obtained information associated with the good or service is based on said at least one user parameter, and
wherein the at least one user parameter is selected from the group consisting of: a location of the user, a volume of business the user conducts with each vendor, and a type of product the user obtains from each vendor.

18. The method of claim 12,
wherein the information associated with the good or service is accessed via a vendor database, wherein the access is performed by either scraping an electronic resource associated with each vendor or by communicating with an application programming interface administered by each vendor.

19. The method of claim 12, further comprising the step of verifying an identity of the user to prevent spoofing by a third party.

20. One or more non-transitory computer-readable media storing computer-executable instructions that, when executed by a processor, perform a method of facilitating secure transactions, the method comprising the steps of:
  presenting, via the user interface, a shipper, a set of carriers and transport information associated with a product transported by said set of carriers,
  wherein the shipper has a preexisting shipper account for each carrier of said set of carriers, and the preexisting shipper account is associated with identification information uniquely identifying the preexisting shipper account,
  wherein the shipper is presented the obtained transport information without having to provide to each carrier the shipper's identification information associated with the shipper's preexisting shipper account;
  receiving, from the user, a response selecting a carrier; and
  measuring a response time and an input rate of the shipper associated with the result to verify that the shipper input is produced by a human.

* * * * *